United States Patent [19]
Nitta et al.

[11] Patent Number: 4,881,266
[45] Date of Patent: Nov. 14, 1989

[54] SPEECH RECOGNITION SYSTEM

[75] Inventors: Tsuneo Nitta, Yokohama; Kensuke Uehara, Setagaya; Sadakazu Watanabe, Kawasaki, all of Japan

[73] Assignee: Kabushiki Kaisha Toshiba, Kawasaki, Japan

[21] Appl. No.: 19,781

[22] Filed: Feb. 27, 1987

[30] Foreign Application Priority Data

Mar. 19, 1986 [JP] Japan .................................. 61-59505

[51] Int. Cl.$^4$ ............................ G10L 5/06; G10L 3/00
[52] U.S. Cl. .......................................... 381/43; 381/46
[58] Field of Search .................................. 381/41–46; 364/513.5

[56] References Cited

U.S. PATENT DOCUMENTS 3,770,892 11/1973 Clapper .................................. 381/45
4,720,802 1/1988 Damoulakis et al. ............. 381/43 X

FOREIGN PATENT DOCUMENTS 0112717 7/1984 European Pat. Off. .

OTHER PUBLICATIONS

IEEE Transactions on Acoustics, Speech & Signal Processing; vol. ASSP-29, No. 4, Aug. 1981; pp. 777–785.
COMPCON 79, 19th IEEE Computer Society International Conference; 4th–7th Sep. 1979, Washington, D.C.; pp. 392–395.
AT&T Bell Laboratories Technical Journal, vol. 63, No. 3, Mar. 1984, pp. 479–498.
The Bell System Technical Journal, vol. 54, No. 2, Feb. 1975; pp. 297–315.

Primary Examiner—Vit W. Miska
Attorney, Agent, or Firm—Foley & Lardner, Schwartz, Jeffery, Schwaab, Mack, Blumenthal & Evans

[57] ABSTRACT

In a speech recognition system for recognizing speeches uttered by non-specific speakers, start and end points of a word or speech interval are determined by a novel preprocessor for searching a sound power level to obtain speech boundary candidates and for determining likelihoods of speech or word intervals on the basis of the boundary candidates. Since likelihoods (probabilities) are determined for speech interval candidates, the similarity rate between feature parameters and reference pattern set of a speech signal are calculated for only the higher likelihood candidates, thus improving the accuracy and the speed of speech recognition. A percentage of erroneous boundary decision is about 0.5% when two speech interval candidates of the first and second likelihoods are adopted.

14 Claims, 9 Drawing Sheets

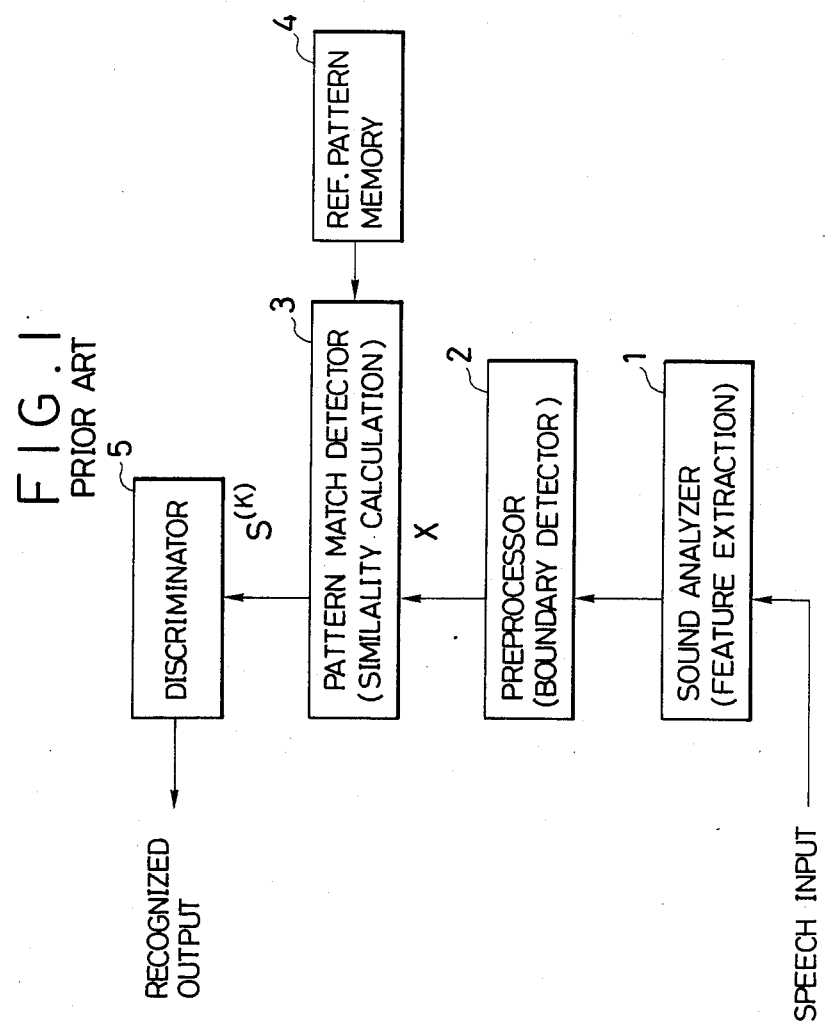

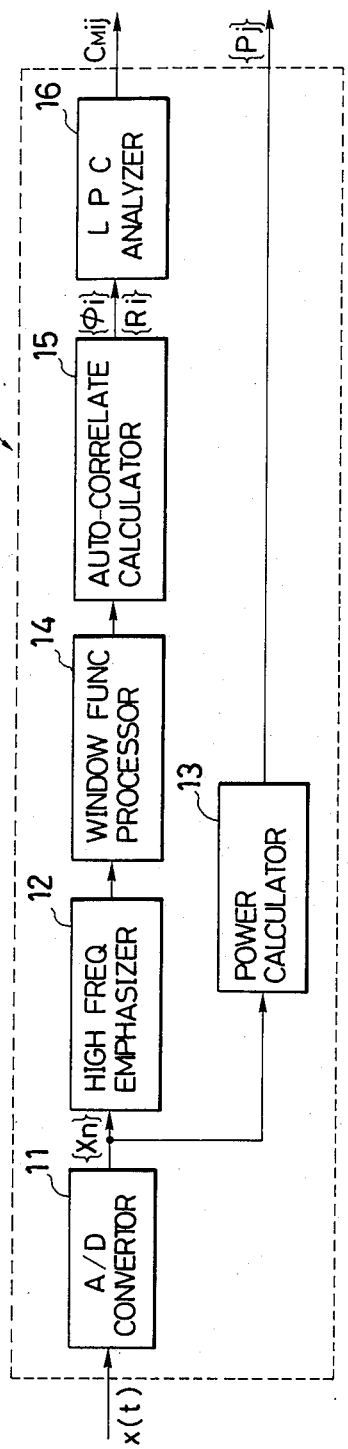
F I G. 4
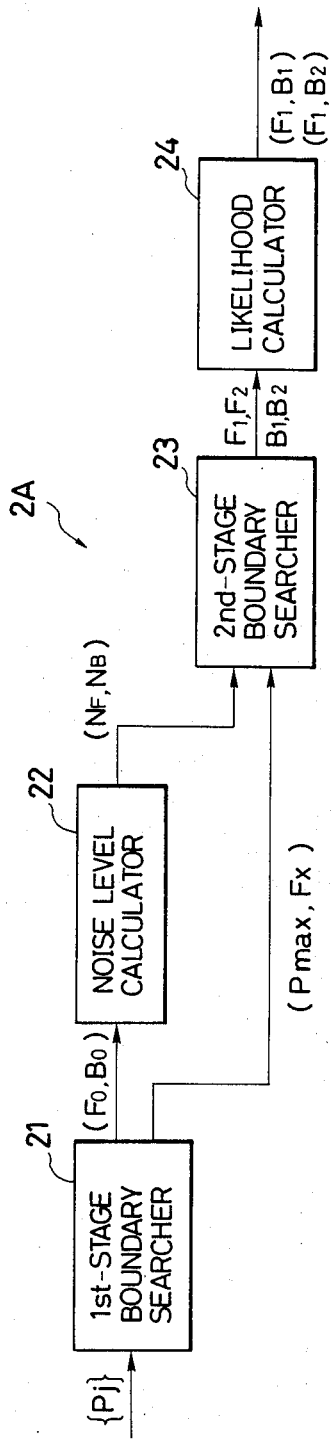
F I G. 5

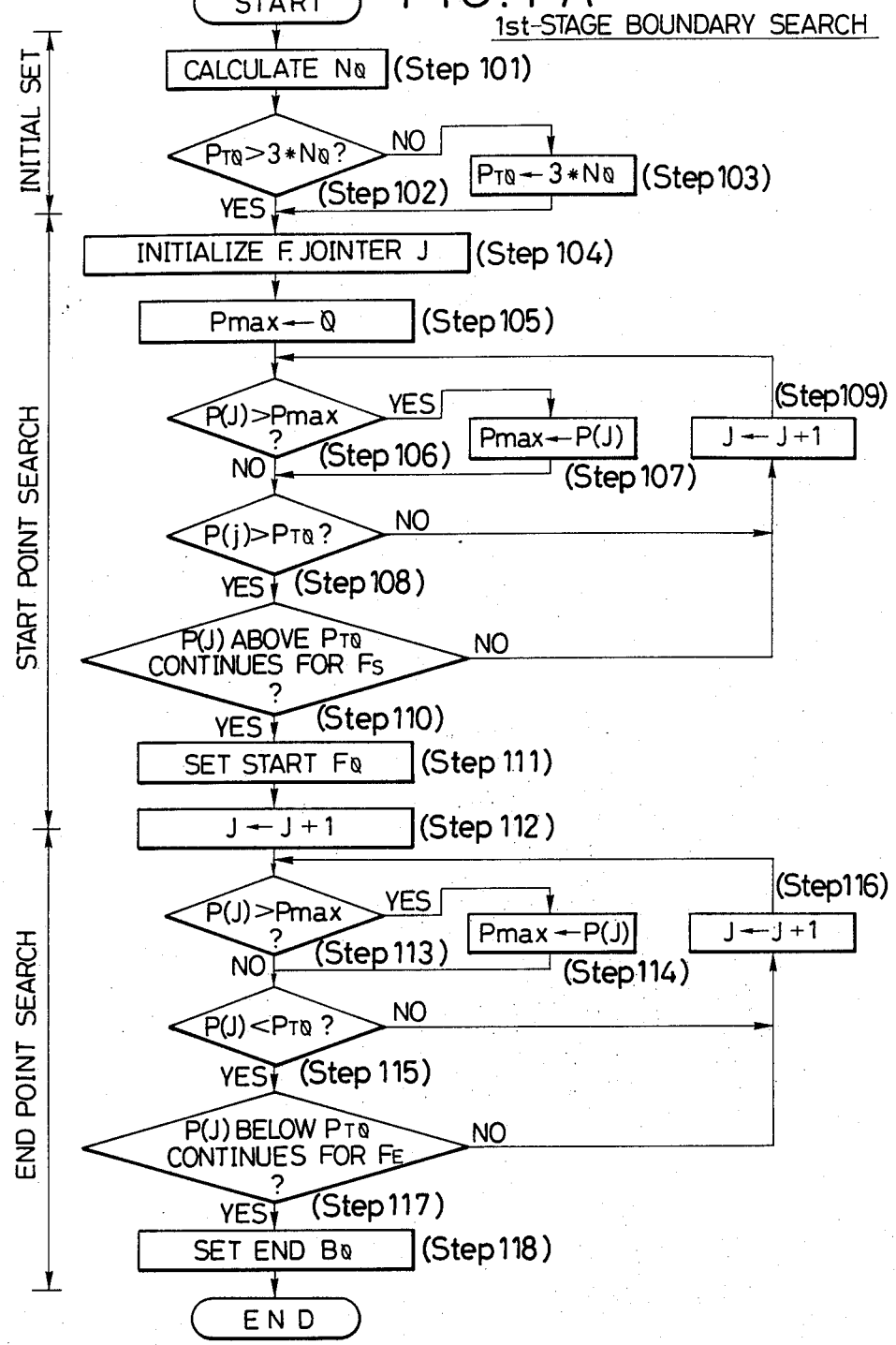

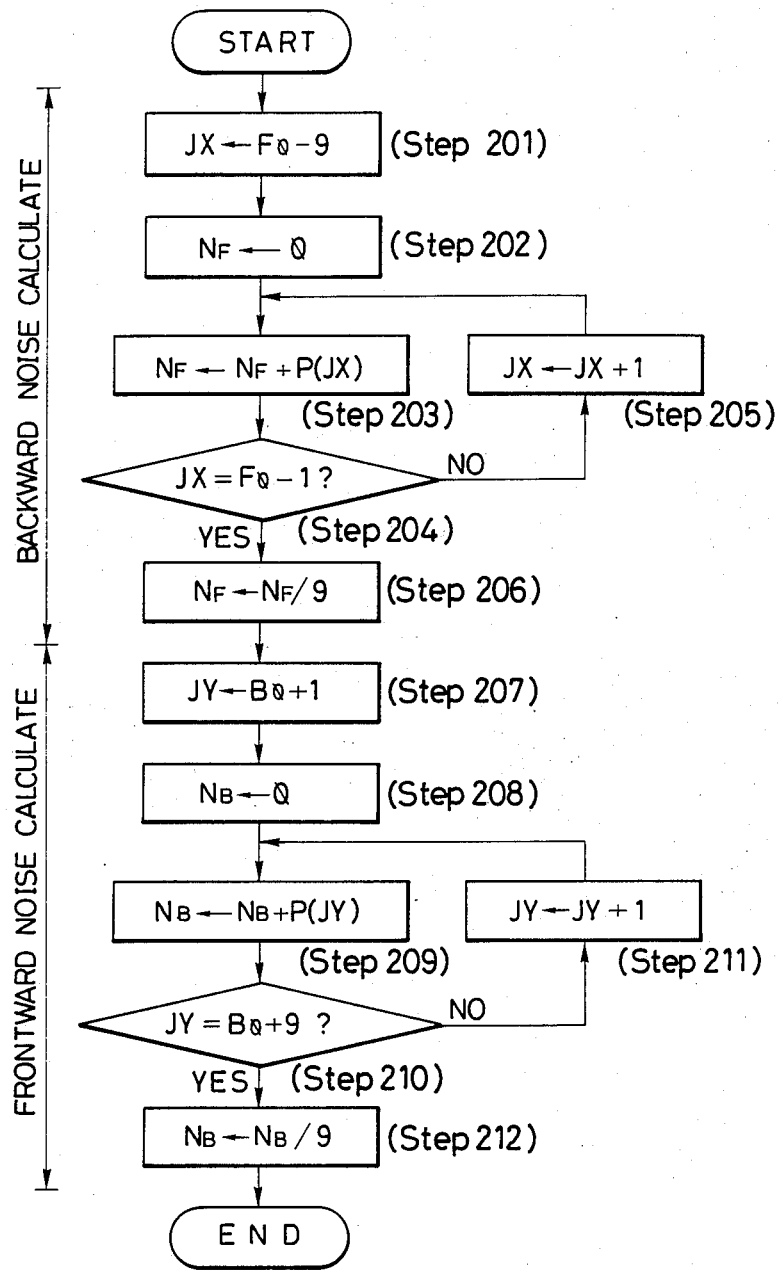

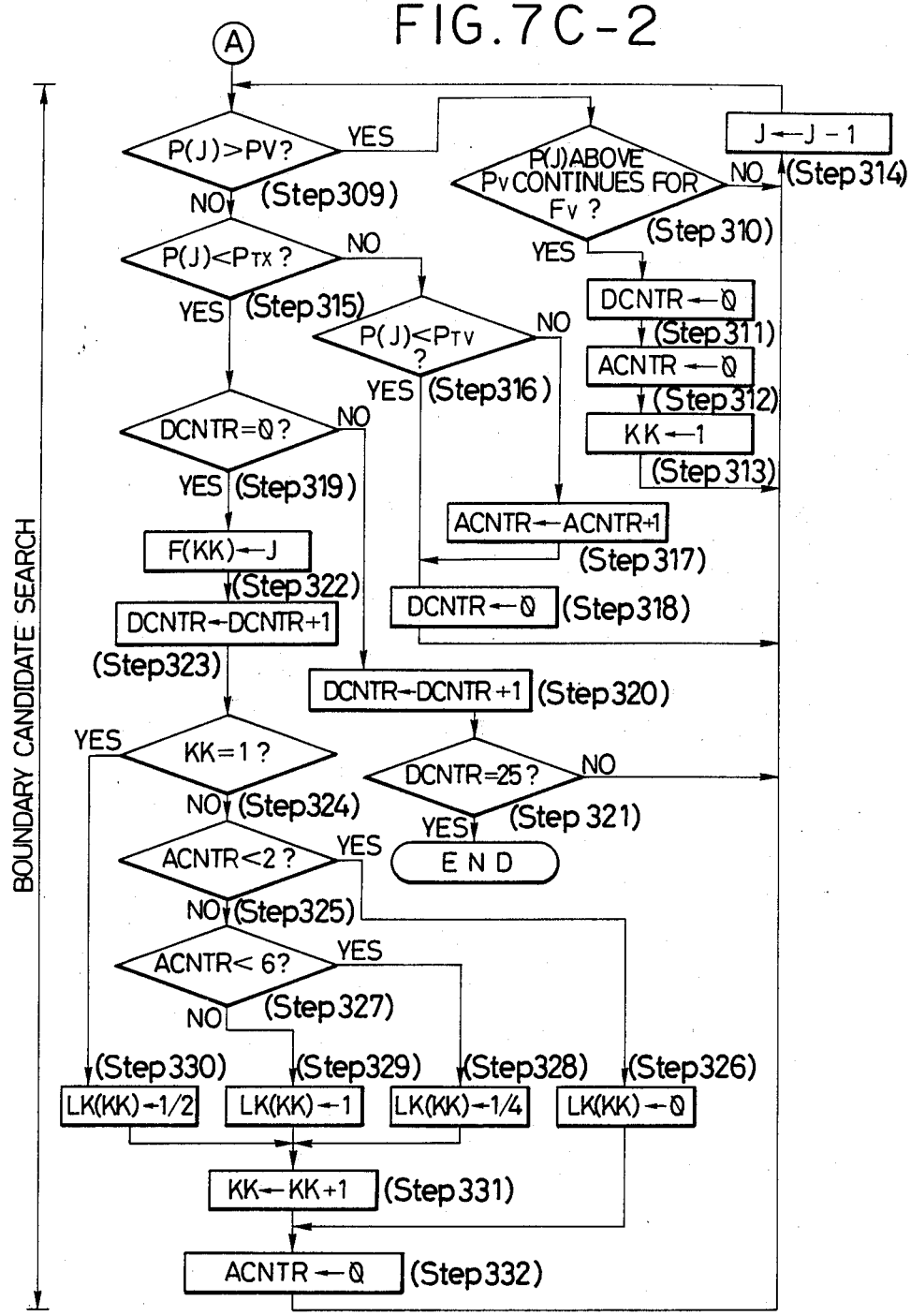

SPEECH RECOGNITION SYSTEM

BACKGROUND OF THE INVENTION

1. Field of the Invention

The present invention relates to a speech recognition system and more specifically to a word or speech boundary detection system for searching sound power of a speech uttered by non-specific speakers to determine a plurality of start and end point candidates of the speech.

2. Description of the Prior Art

An ordinary speech recognition system is configured as shown in FIG. 1. A speech signal transduced through a microphone, for instance is analyzed by a sound analyzer 1 in accordance with band-pass filter (BPF) analysis or a linear prediction coding (LPC) analysis; the analyzed speech signal is pre-processed by a preprocessor to detect speech boundaries (start and end of a word) and to normalize the analyzed signal with respect to its amplitude; similarities (distance) between the preprocessed patterns and reference patterns previously registered in a reference pattern memory 4 are calculated by a pattern match detector 3; and then the magnitudes of the detected similarities are compared with a predetermined level by a discriminator 5 to finally recognize the inputted speech.

In the speech recognition processings as described above, the word boundary detection technique involves serious problems, because a speech signal varies with the time elapsed and includes a considerable level of background noise. To improve the accuracy of the word or speech boundary detection, a great effort has been made; however, since miscellaneous noises (such as a tongue-clicking, breathing, rumble, etc.) produced by a speaker itself are superimposed upon a speech in addition to surrounding noise or circuit noise (in the case of a telephone speech), it has been impossible to eliminate detection errors as long as a word boundary or a start and an end of a speech are determined by simply detecting the duration of a word or a speech exceeding a threshold level.

FIG. 2 is an example of sonagraph obtained when a telephone speech of "8 (/hat∫i/)" (8 is pronounced as denoted above in phonetic symbol in the Japanese language) is uttered by a women under background noise in an office room and analyzed in accordance with LPC method. In this sonagraph, the sound power is plotted in logarithmic scale (log G) on the upper side and depicted in the manner of character shading (MZ7l+ —) printed by a computer with respect to frequency components on the lower side. Further, a frame represents an aggregation of a series of bits within a periodically repeated digit time slot (window). The time intervals (frame rate) between two frames shown in FIG. 2 is about 8 to 10 ms.

In this example shown in FIG. 2, since speech of other office workers is superimposed upon the speech of "8" as background noise, when the conventional speech recognition system is adopted, a position B2 (Frame No. 110) is erroneously detected as an end of a word of "8", in spite of the fact that the correct end of "8" is B1 (Frame No. 82).

Further, the conventional method of simply determining start and end of a word involves other problems as follows: For instance, in the case of a telephone speech recognition system for recognizing various speeches of a plurality of non-specific speakers, it may be possible to previously determine a reference speech dictionary on the basis of many person's speeches. However, in determining a boundary, since a consonant near a start of a sound "g" of "5 /gō/", for instance is not necessarily detected accurately as a start thereof at the head of "5" (before "g"), there exists a problem such that it is impossible to improve the recognition performance, if various modifications such as starts of consonant sounds, intermediate portions of consonant sounds, transits to vowel sound, etc. are not included in the reference speech dictionary. Further, as a result of the fact that various modifications should be included in the dictionary, when the number of words to be recognized increases (due to an increase in the number of words of similar syllable series), a difference between /gō/ and /ō/ is not discriminated and therefore the similarity rate increases, thus resulting in another problem in that the rejection faculty is lowered and therefore recognition performance is deteriorated.

SUMMARY OF THE INVENTION

With these problems in mind, therefore, it is the primary object of the present invention to provide a speech recognition system which can detect a word boundary (start and end of a word) accurately without being subjected to the influence of background noise.

To achieve the above-mentioned object, a speech recognition system according to the present invention comprises:

(a) means for analyzing a speech signal to obtain feature parameters of the speech signal; (b) means for searching the obtained feature parameters to obtain a plurality of speech boundary candidates and determining likelihoods of speech intervals determined on the basis of the obtained boundary candidates; (c) means for detecting re-sampled pattern by equally dividing the obtained speech intervals into some sampling points to sample the feature parameters and calculating similarities between the sampled feature parameters and reference pattern set, at each of the sampling points of the speech interval in the order of the likelihoods from the highest likelihood down to a predetermined lower likelihood; and (d) means for discriminating the speech signal as recognized outputs on the basis of the calculated similarities obtained at a plurality of determined speech intervals and arranged in the order of the likelihood.

The searching means comprises: (a) a first-stage word boundary searcher for determining a start point obtained when sound power analyzed by said analyzing means as one of feature parameters drops below a predetermined threshold for a first predetermine frame time interval, an end point obtained when the sound power drops below the threshold for a second predetermined frame time interval, a maximum power and a maximum power point; (b) a noise level calculator for calculating a mean front noise level F near before the start point and a mean back noise level near after the end point; (c) a second-stage word boundary searcher for calculating thresholds on the basis of the mean front noise level and the mean back noise level, searching the sound power from the maximum power point in the backward direction to obtain start word boundary candidates when the sound power drops below the threshold level for a predetermined frame time interval and to determine likelihoods of the obtained start word boundary candidates on the basis of the frame time interval length, and searching the sound power from the maximum power point in the forward direction to obtain end word boundary candidates when the sound power drops below the threshold level for a predetermined frame time interval and to determine likelihoods of the obtained end word boundary candidates on the basis of the frame time interval length; and (d) a likelihood calculator for determining likelihoods of speech intervals between the obtained start and end word boundary candidates on the basis of additions of the determined start and end word boundary likelihoods.

In the system according to the present invention, plural speech interval candidates are searched and plural likelihood (probabilities) are determined for the searched speech interval candidates, and the similarities between the feature parameters of a speech signal and the reference pattern set are calculated for only the higher likelihood candidates, so that it is possible to increase the recognition speed and the recognition precision.

In the method according to the present invention, it is possible to reduce recognition errors markedly particularly when background noise level is high.

BRIEF DESCRIPTION OF THE DRAWINGS

The features and advantages of the speech recognition system according to the present invention over the prior art system will be more clearly appreciated from the following description of the preferred embodiment of the invention taken in conjunction with the accompanying drawings in which like reference numerals designate the same or similar sections and in which:

FIG. 4 is a schematic block diagram showing a sound analyzer incorporated in the speech recognition system shown in FIG. 3;

FIG. 5 is a schematic block diagram showing a preprocessor incorporated in the speech recognition system shown in FIG. 3;

FIG. 7A is a flowchart showing steps of executing the first-stage boundary search operation;

FIG. 7B is a flowchart showing steps of executing the mean noise level calculation.

DETAILED DESCRIPTION OF THE PREFERRED EMBODIMENTS

An embodiment of a speech recognition system according to the present invention will be described hereinbelow with reference to the attached drawings.

Figure 3:
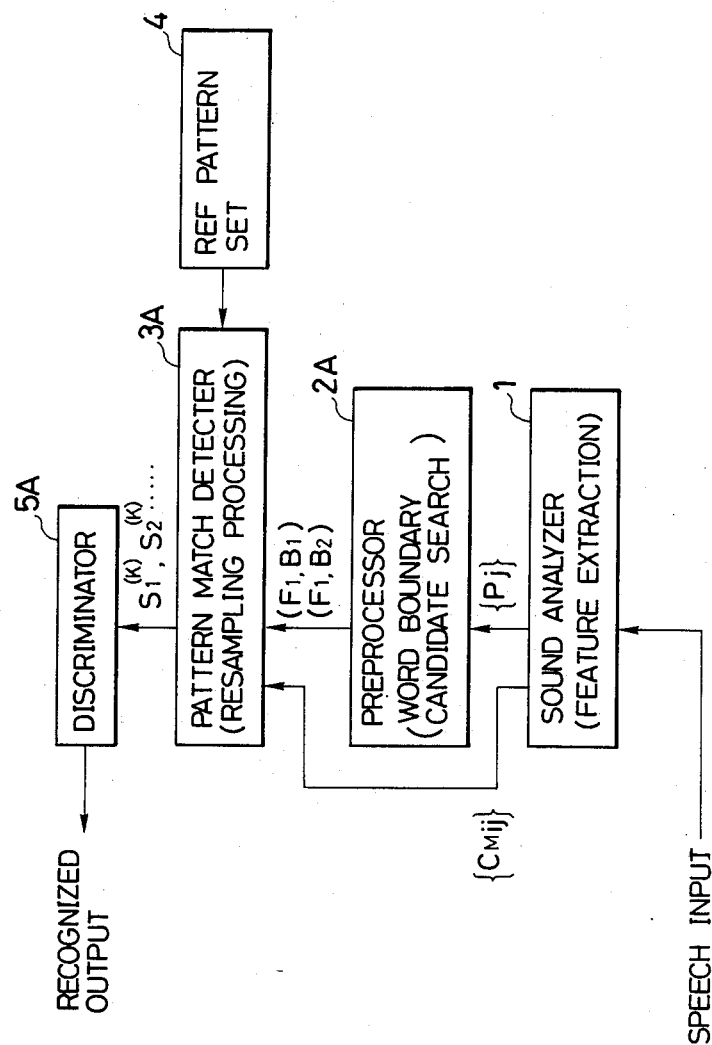
FIG. 3 is a schematic block diagram showing an embodiment of the speech recognition system according to the present invention.
Figures 1, 7C:
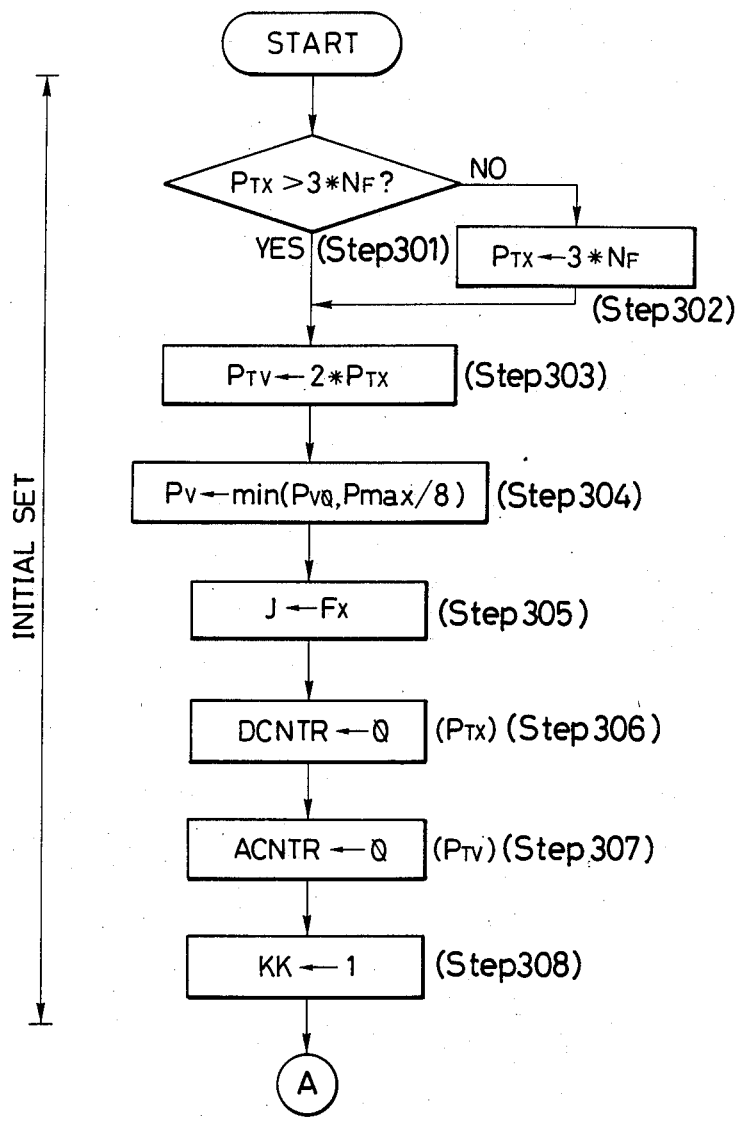
FIG. 1 is a schematic block diagram showing an example of prior-art speech recognition system.
FIG. 7C is a flowchart showing steps of executing the second-stage boundary search operation.

FIG. 3 is a schematic block diagram of a speech recognition system for non-specific speakers. The system comprises a sound analyzer 1 for extracting feature parameters of a speech input signal, a preprocessor 2A for searching an analyzed signal to obtain word boundary candidates, a pattern match detector 3A for calculating a distance or a similarity rate between the searched candidate pattern and a reference pattern previously registered in a reference pattern memory 4, and a discriminator 5A for comparing the calculated similarity rate with a predetermined level to finally recognize the inputted speech. In FIG. 3, the blocks denoted by 2A, 3A and 5A are different in function from those denoted by 2, 3 and 5 in FIG. 1 (prior art).

Each block shown in FIG. 3 will be described in greater detail hereinbelow.

As shown in FIG. 4, the sound analyzer 1 of LPC analysis type includes an A/D converter 11, a high frequency band emphasizer 12, a sound power calculator 13, a window function processor 14, an auto-correlation calculator 15, and an LPC analyzer 16.

The operation of the sound analyzer 1 will be described hereinbelow. The input speech signal X (t) is converted from an analog signal into digital signals $\{X_n\}$ (i.e. $x_1, x_2, \ldots x_j, \ldots$) through the A/D converter 11. The converted digital signals $\{X_n\}$ are applied to the power calculator 13 to obtain the sound power $\{P_j\}$ of each of the digital signals $\{X_n\}$. Some word boundary candidates of an input speech are determined on the basis of the calculated sound power $\{P_j\}$ at the succeeding stage, as described later in greater detail.

On the other hand, the digital signals $\{X_n\}$ are emphasized at high frequency band through the high frequency band emphasizer 12 in accordance with the following formula:

$$X_n = X_n - \beta X_{n-1} \tag{1}$$

where $\beta$ is a constant (0.9 to 1.0).

A series of the digital sound signals whose high-frequencies are emphasized are applied to the window function processor 14 to effect a predetermined window function processings. For instance, Haming window function $W_n$ can be given as $$W_n = 0.54 - 0.46 \cos (2\pi n/N) \tag{2}$$

where N denotes the window length.

However, it is of course possible to use other window functions in place of Haming window.

The signals included in each window are applied to the auto-correlation calculator 15 to obtain auto-correlation coefficients $\{\phi_i\}$ and normalized auto-correlation coefficients $\{R_i\}$ in accordance with the following formulae:

$$\phi_i = 1/N \sum_{n=1}^{N-|i|} X_n \cdot X_{n+|i|}, \quad i = 0,1, \text{to } N - 1 \quad (3)$$

$$R_i = \phi_i/\phi_0 \quad (4)$$

Further, the LPC analyzer 16 calculates linear prediction coefficients $\{\alpha_i\}$ on the basis of the above normalized auto-correlation function $\{R_i\}$ in accordance with a recurrence formula expressed by (5) below. Several methods for obtaining the coefficients $\{\alpha_i\}$ have been proposed. For instance, in the case of "Durbin" recursive calculation method, coefficients $\{\alpha_i\}$ of i (=0 to p) pieces can be obtained in sequence by repeating the processings from 1 to 4 as follows:

$$
\begin{aligned}
u_0 &= 1, \alpha_0 = 1 \\
1\ W_{i-1} &= \sum_{j=0}^{i-j} \alpha_j^{(i-1)} \cdot R_{i-j} \\
2\ K_i &= W_{i-1}/u_{i-1}, \alpha_i^{(i)} = -K_i \\
3\ \alpha_j^{(i)} &= \alpha_j^{(i-1)} - K_i \alpha_{i-j}^{(i-1)}, 1 \leq j \leq i/2 \\
\alpha_{i-j}^{(i)} &= \alpha_{i-j}^{(i-1)} - K_i \alpha_j^{(i-1)}, 1 \leq j \leq (i-1)/2 \\
4\ u_i &= (1 - K_i^2)\ u_{i-1} < i \leftarrow i + 1
\end{aligned}
\quad (5)
$$

Subsequently, an LPC analyzer section 16 calculates LPC melcepstrum coefficients $\{C_{Mi}\}$ on the basis of the linear prediction coefficients $\{\alpha_i\}$ in accordance with the following procedure. Here, the above melcepstrum is a function obtained by Fourier-transforming a spectrum expressed in logarithnic scale with respect to frequency by replacing frequency with time.

Power spectra $\{P_i\}$ are first obtained from $\{\alpha_i\}$. In this case, the frequency axis is transformed into a mel-measure (a scale corresponding to human hearing sense) as follows:

$$Pi = \frac{G}{\left[\sum_{k=0}^{n-1} \alpha_i \cos(2\pi i k'/N)\right]^2 + \left[\sum_{k=0}^{N-1} \alpha_i \sin(2\pi i k'/N)\right]^2}, \quad (6)$$

$$i = 0, 1, 2, \ldots, (N/2) - 1$$

$$k' = (1000N/f_s)\left(2^{\frac{2.322k}{N/2}} - 1\right) \quad (7)$$

where $f_s$ denotes the sampling frequency.

Figure 2:
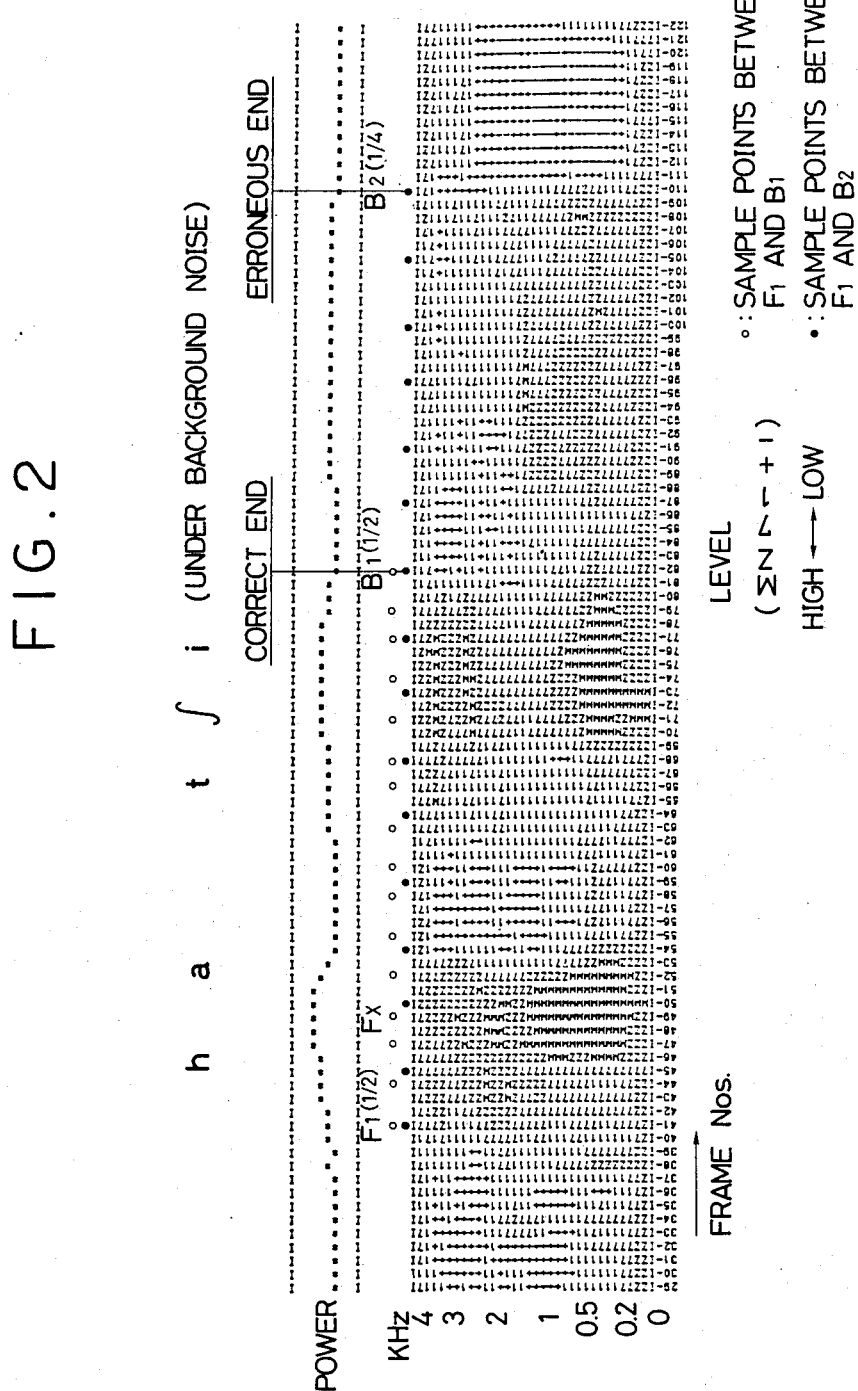
FIG. 2 is a graphical representation (sonagraph) showing sound power of a telephone speech of "8 /hat ʃi/" uttered by a woman and analyzed in accordance with an LPC method.

FIG. 2 shows a sonagraph of this power vector $\{P_i\}$ obtained when "8 /hat∫i/" is uttered, by way of example of speech analysis. Further, in this sonagraph, the magnitude of level is depicted in the manner of character shading (MZ71+—), in which the left side characters indicate higher level than right side characters.

The LPC melcepstrum $\{C_{Mi}\}$ is then obtained from $\{P_i\}$ as follows:

$$C_{Mi} = \sum_{K=0}^{N-1} (10 \log P_K) \cos(2\pi iK/N), \quad (8)$$

$$i = 0, 1, 2, \ldots M$$

where each value of $(N/2)+1$ to $(N-1)$ in $P_K$ can be obtained by folding each value of 0 to $(N/2)-1$ and M is 4 to 16.

As described above, the sound processor 1 shown in FIG. 3 outputs a series of sound powers $\{P_j\}$ and a series of LPC Melcepstrum coefficients $\{C_{Mij}\}$. Here, it should be noted that j denotes an ordinal number of signals included in a window with a length N, as understood by the afore-mentioned formulae, while i denotes a number of Melcepstrum coefficient.

The preprocessor 2A for searching word boundary candidates comprises a first-stage word boundary searcher 21, a noise level calculator 22, a second-stage word boundary searcher 22, and a likelihood calculator 24, as depicted in FIG. 5.

Figure 6A:
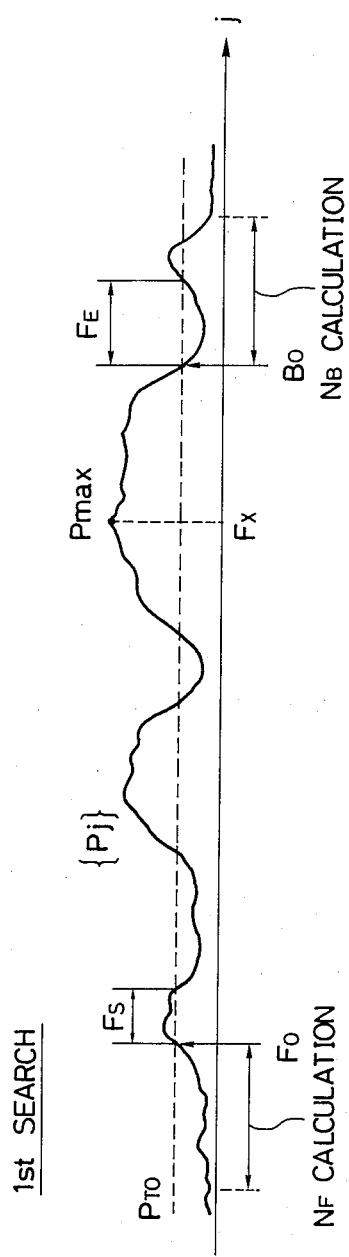
FIG. 6A is a graphical representation for assistance in explaining the operation of the first-stage boundary search.
Figure 6B:
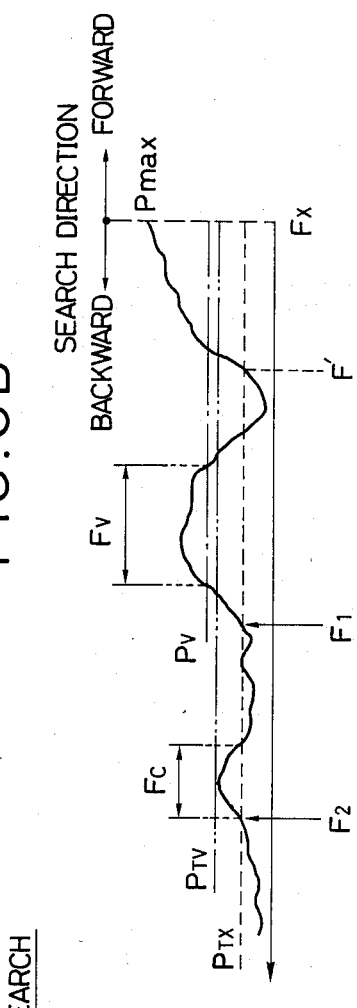
FIG. 6B is a graphical representation for assistance in explaining the operation of the second-stage boundary search.

The operation of each of these sections 21, 22, 23, 24 will be described with reference to FIGS. 6A and 6B.

(a) 1st-staage word boundary searcher 21:

A start point $F_o$ of a word is determined when the sound power $\{P_j\}$ exceeds a predetermined threshold $P_{TO}$ continuously for more than a predetermined number of frames $F_s$. An end point $B_o$ of a word is determined when the sound power $\{P_j\}$ drops continuously below the predetermined threshold $P_{TO}$ for more than a predetermined number of frames $F_E$ as shown in FIG. 6A. This threshold level is determined as a value 2 to 5 times higher than background noise level during which no speech in inputted, instead of a fixed value.

A series of the above processings are executed by scanning once the power $\{P_j\}$ in the time axis direction, and further the maximum power value $P_{max}$ and its frame position $F_X$ are extracted. The points $F_o$ and $B_o$ are determined as the primary start and end candidates.

(b) Noise level calculator 22:

The noise level calculator 22 calculates a means start noise level $N_F$ during several frames (e.g. $F_o-9$ to $F_o-1$) just before the primary start candidate point $F_o$ and a mean noise level $N_B$ during several frames (e.g. $B_o+1$ to $B_o+9$) just after the primary end candidate point $B_o$.

(c) 2nd-stage word boundary searcher 23:

In the secondary search operation, some word boundary candidates are determined on the basis of some threshold levels determined by the maximum sound power $P_{max}$, the mean start noise level $N_F$ and the mean end noise level $N_B$ obtained in the primary search operation, searching from the maximum power point $F_X$ in the backward and the frontward directions.

The operation of searching some start word boundary candidates will be described with reference to FIG. 6B. A first threshold level $P_{TX}$ and a second threshold level $P_V$ are determined as follows: For $P_{TX}$, a constant noise level of 100 to 500 (relative sound pressure level determined by a noise meter) is given. However, if the start noise level $N_F$ is high, $P_{TX}$ is determined as (2 or 3)×$N_F$. For $P_V$, a lower level of either $P_{VO}$ or $P_{max}/D$ is given in order to securely determine a more likely word boundary. Here, $P_{VO}$ is 500 to 1000 and D is 5 to 20.

Starting from the point $F_X$ at which the maximum sound power $P_{max}$ is given, a point F' is first determined as a word boundary candidate because the power first drops below the first threshold $P_{TX}$. However, this candidate is abandoned because thereafter there exists a frame interval $F_V$ sufficiently recognizable as a word interval, during which the sound power exceeds the second threshold $P_V$ for a frame interval $F_V$ more than a predetermined value (e.g. 8 to 12 frames).

Subsequently, a point $F_1$ is determined as another word boundary candidate because the power drops below the first threshold $P_{TX}$. Further, proceeding backward, a point $F_2$ is determined as the other word boundary candidate, because the power exceeds the first threshold $P_{TX}$ for a frame interval $F_c$ and then drops below the threshold $P_{TX}$ for a relatively long frame interval (e.g. 20 to 25 frames), at this point $F_2$ of which the search operation ends.

Here, another new threshold level $P_{TV}=2\times P_{TX}=(4$ to $6)\times N_F$ is determined. If the sound power $P_j$ exceeds this level $P_{TX}$ for 6 to 8 frames, this start candidate is determined as the likelihood=1. If $P_j$ exceeds $P_{TV}$ for 2 to 5 frames, this candidate is determined as likelihood=½. If $P_j$ exceeds $P_{TV}$ for 1 frame, this candidate is determined as likelihood=0, that is, this candidate is not regarded as a candidate. Further, a candidate firstly searched is determined as likelihood=½.

The similar processing is applied to the searching of the word end boundary, starting from the point $F_X$ in the frontward direction, to extract some boundary candidates. In the example shown in FIG. 2, the point $B_1$ is determined as likelihood=½ and the point $B_2$ is determined as likelihood=¼.

(d) Likelihood calculator 24:

On the basis of the determined start and end candidates ($F_1$, $F_2$, or $B_1$, $B_2$), the word frame intervals are sent to the pattern match detector 3A in the order of the determined likelihood. For instance, in the case where a start candidate point $F_1$ (½), a first end candidate $B_1$ (½), and a second end candidate $B_2$ (¼) (parentheses denote likelihoods) are searched, two frame intervals of ($F_1$, $B_1$) of the likelihood=½+½=1 and ($F_1$, $B_2$) of the likelihood=½+¼=0.75 are extracted as two frame interval candidates as shown in FIG. 2. These intervals are determined as candidates only when the power exceeds a predetermined number of frames (e.g. 8 to 15), and the candidate intervals are transferred to the pattern match detector 3A in the order of ($F_1$, $B_1$) and ($F_1$, $B_2$) Further, if the addition of two likelihoods (start and end) is equal to each other, a word interval candidate with a larger start likelihood has priority over that with a smaller start likelihood.

In the pattern match detector 3A, the LPC melceptrum coefficients $\{C_{Mij}\}$ supplied from the LPC analyzer 16 of the sound analyzer 1 are sampled. In practice, time series of coefficients $\{C_{1ij}\}$) corresponding to the interval ($F_1$, $B_1$) are equally divided into 15 subintervals, so that these coefficients $\{C_{1ij}\}$ are extracted at 16 points (i=1 to 16, j=1 to 16) as feature parameters, as shown by the white circles in FIG. 2. In the same way, the coefficients $\{C_{2ij}\}$ are extracted at 16 points (i=1 to 16, j=1 to 16) as feature parameters, as shown by black circles in FIG. 2. Similarly, feature parameters corresponding to the transferred word interval candidates are sampled and processed.

Subsequently, complex similarities between $\{C_{1ij}\}$ and a reference pattern set of each category previously registered in the reference pattern memory 4 are calculated in accordance with the following formula, and the value ($S_1^{(K)}$) is given to the discriminator 5.

$$S_1^{(K)} = \sum_{m=1}^{L} W_m^{(K)} (C_1 \phi_m^{(K)})^{2/} ||C_1||^2 \qquad (9)$$

where, $C_1 = \{C_{1ij}\}, i = 1$ to $16, j = 1$ to $16$ $$W_{ml}^{(K)} = \lambda_m^{(K)}/\lambda_1^{(K)}$$

$\lambda_m^{(K)}$, $\phi_m^{(K)}$ are eigenvalues and eigenvectors obtained by KL expansion from covariance matrix of each category K, and L denotes the number of eigen vectors.

In the same way, when $\{C_{2ij}\}$ exists, the complex similarities are calculated as $C_1=C_2$ by the above formula, and the result ($S_2^{(K)}$) is given to the discriminator 5. Owing to the same processings, $S_3^{(K)}$, $S_4^{(K)}$ ... are given to the discriminator 5.

In the discriminator 5A, after having decided the maximum value $\{S^{(K)}\}$ for each category on the basis of the similarities $\{S_1^{(K)}, S_2^{(K)}...\}$, these values are sorted in the order of magnitude, and outputted to a necessary order (e.g. the third order) as the recognition result.

In the above-description, the operation of the preprocessor 2A for searching word boundary candidates has been explained on the basis of hardware as shown in FIG. 5. In practice, however, the same operation is executed in accordance with microprogram loaded in a programmable read only memory. Therefore, the operation of the preprocessor 2A will be described again with reference to flowcharts shown in FIGS. 7A to 7C.

(a) 1st-stage word boundary search (FIG. 7A):

Control first calculates a noise level $N_o$ within non-speech interval (in step 101), and determines a threshold level $P_{TO}$ as $P_{TO}=3*N_o$. The determined threshold level is checked (in step 102). If $P_{TO}\geq 3*N_o$, control proceeds to the succeeding step to initialize the frame pointer (in step 104). If $P_{TO}<3*N_o$, control sets $P_{TO}$ to $3*N_o$ (in step 103) and then initializes the frame pointer to J=0 (in step 104). Control starts to search the maximum sound power $P_{max}$ by first setting $P_{max}$ to $P_o$ (in step 105). Control checks whether the sound power P(J) exceeds the current maximum $P_{max}$ (in step 106). If YES (in step 106), the power P(J) is set as the current maximum power $P_{max}$ at point J (in step 107). If NO (in step 106), control checks whether power P(j) exceeds $P_{TO}$ (in step 108). If NO (in step 108), pointer 5 is incremented (in step 109), returning to step 106. If YES (in step 108), control checks whether power P(j) above $P_{TO}$ continues for frame intervals $F_s$ (in step 110). If NO (in step 110), pointer J is incremented (in step 109), returning to step 106. If YES (in step 110), a word start point $F_o$ is determined (in step 111) and pointer J is incremented (in step 112).

Again, control checks whether sound power P(J) exceeds the current maximum value (in step 113). If YES (in step 113), P(J) is determined as a new maximum power $P_{max}$ at point J (in step 114). If NO (in step 113), control checks whether power P(j) is below $P_{TO}$ (in step 115). If NO (in step 115), pointer J is incremented (in step 116), returning to step 113. If YES (in step 115), control checks whether power P(j) below $P_{TO}$ continues from frame intervals $F_E$ (in step 117). If NO (in step 117), pointer J is incremented (in step 116), returning to step 113. If YES (in step 117), a word end $B_o$ is determined (in step 118) and control ends.

In summary, a start point $F_o$ and an end point $B_o$ are determined by scanning the sound power P(J) once in the time axis direction (the forward direction).

(b) Noise level calculation (FIG. 7B):

Control first sets the frame pointer JX to $(F_o-9)$ (where $F_o$ is a start point determined in FIG. 7A) (in step 201), and first sets the frontward noise level $N_F$ to 0 (in step 202). All noise levels $N_F$ or P(JX) are added from $(F_o-9)$ to $(F_o-1)$ in frame number. That is, the current noise level is an addition of the preceding noise level $N_F$ and the current noise or power level P(JX) at frame No. JX (in step 203). Control repeatedly checks whether JX reaches $(F_o-1)$ (in step 204). If NO (in step 204), JX is incremented (in step 205), returning to step 203 to repeat the calculation. If YES (in step 204), since all the noise levels $N_F$ from $(F_o-9)$ to $(F_o-1)$ are added (in step 203), the added value $N_F$ is divided by 9 to obtain a mean frontward noise level $N_F$.

Control again sets the frame pointer JY to $(B_o+1)$ (where $B_o$ is an end point determined in FIG. 7A) (in step 207), and first sets the backward noise level $N_B$ to 0 (in step 208). All noise levels $N_B$ or P(JX) are added from $(B_o+1)$ to $(B_o+9)$ in frame number. That is, the current noise level is an addition of the preceding noise level $N_B$ and the current noise or power level P(JY) at frame No. JY (in step 209). Control repeatedly checks whether JY reaches $(B_o+9)$ (in step 210). If NO (in step 210), JY is incremented (in step 211), returning to step 209 to repeat the calculation. If YES (in step 210), since all the noise levels $N_B$ from $(B_o+1)$ to $(B_o+9)$ are added (in step 209), the added value $N_B$ is divided by 9 to obtain a mean backward noise level $N_B$.

(c) 2nd-stage word boundary search (FIG. 7C):

Control first checks whether the first threshold level $P_{TX}$ is higher then $3*N_F$ (where $N_F$ is the mean frontward noise level determined in FIG. 7B) (in step 301). If NOT (in step 301), control sets $P_{TX}$ to $3*N_F$ (in step 302). If YES (in step 301), control sets the second threshold level $P_{TV}$ ($P_{TX}<P_{TV}<P_V$) to $2*P_{TX}$ or $6*N_F$ (this level $P_{TV}$ is used to determine boundary likelihood) (in step 303). Further, control sets the third threshold level $P_V$ by selecting a lower level of either $P_{VO}$ or $P_{max}/D$ (where $P_{VO}$ is a constant level and D is a constant value of 8) (in step 304).

Since control starts from a point $F_X$ at which the maximum sound power $P_{max}$ is given in the backward direction, the point $F_X$ at which the maximum power $P_{max}$ is given is set to J (in step 305). A first counter DCNTR for counting the number of frames during which the sound power P(J) exceeds the first threshold $P_{TX}$ is cleared (in step 306). This first counter is used to determine the end of the search. A second counter ACNTR for counting the number of frames during which the sound power P(J) exceeds the second threshold $P_{TV}$ is cleared (in step 307). This second counter is used to determine the likelihoods. Further, the word boundary candidate number KK is set to 1 (in step 308). Initialization is thus completed.

Control checks whether the sound power P(J) exceeds the third threshold $P_V$ (in step 309). If YES (in step 309), control checks whether the P(J) above $P_V$ continues for frame intervals $F_V$ (in step 310). If NO (in step 310), frame jointer J is decremented (in step 314), returning to step 309. If YES (in step 310), the first counter DCNTR is cleared (in step 311); the second counter ACNTR is cleared (in step 312); the boundary candidate number KK is set to 1 again (in step 313); and the frame jointer J is decremented (in step 314), returning to step 309 again. These steps serve to cancel some start point candidates or the control end point candidates already started to count frame numbers, because a frame interval recognizable as a word interval is now detected in steps 309 and 310.

If NO (in step 309), control checks whether P(J) drops below the first threshold $P_{TX}$ (in step 315). If NO (in step 315), control checks whether P(J) drops below the second threshold $P_{TV}$ (in step 316). If NO (in step 316), that is, if $P_{TX}<P_{TV}<P(J)<P_V$, the second counter ACNTR for counting the likelihood is incremented to detect the likelihood (in step 317). If YES (in step 316); that is, if $P_{TX}<P(J)<P_{TV}<P_V$, the first counter DCNTR for counting the end of the search is cleared (in step 318); the frame pointer J is decremented (in step 314), returning to the step 309 again. These steps serve to cancel some control end point candidates already started to count frame numbers, because $P(J)>P_{TX}$.

If YES (in step 315), control checks whether the first counter DCNTR (control end) is cleared (in step 319). If NO (in step 319), since this indicates that P(J) drops below $P_{TX}$, the first counter DCNTR is incremented (in step 320). Control checks whether the counted value by the counter DCNTR reaches 25 (in step 321). If YES (in step 321), since this means P(j) drops below $P_{TX}$ for a sufficiently long period, search operation ends. If NO (in step 321), the frame pointer J is decremented (in step 314), returning to step 309.

If YES (in step 319), since this indicates that the counting for search end has not yet been started and further $P(J)<P_{TX}<P_{TV}<P_V$, boundary candidate detection starts. That is, J is set to the candidate frame number F (KK) (in step 322) and the first counter DCNTR is incremented (in step 323). Control checks whether this candidate number KK is 1 (in step 324). If YES (in step 324), since this is the first candidate, the likelihood of this candidate LK (KK) is determined as ½ (in step 330). If NO (in step 324), control checks whether the second counter ACNTR counts 1 or less (in step 325). If YES (in step 325), this candidate is disregarded (in step 326); the counter ACNTR is cleared (in step 332) and the frame pointer J is decremented (in step 314), returning to step 309.

If YES (in step 325), control checks whether the counter ACNTR counts 5 or less (in step 327). If YES (in step 327), the likelihood of this candidate LK (KK) is determined as ¼ (in step 328). If NO (in step 327), the likelihood of this candidate LK (KK) is determined as 1 (in step 329). Once the likelihood is determined (in step 328, 329, 330), the candidate number KK is incremented (in step 331); the counter ACNTR is cleared (in step 332); the frame pointer J is decremented (in step 314), returning to the step 309.

In summary, the likelihood is determined as 1 when the sound power P(J) drops below $P_{TV}$ for 6 or more frames; as ¼ for 2 to 5 frames; and as ½ for the first candidate.

On the basis of the above-mentioned series of processings, it is possible to correctly recognize a word previously recognized erroneously due to error in word boundary detection. Table 1 below shows the experiment result of the percentages at which correct word intervals are not extracted on the basis of the first and second likelihoods, when 1000 sample speeches (telephone speech including numerals) are recognized by the method of the present invention. In this experiment, two candidates were determined in each of start and end detections; that is, four word intervals were extracted. However, only a single word interval was extracted in speeches of 85%, and two word intervals were extracted in almost the remaining speeches of 15%. Further, even when four intervals were extracted, the speech was almost correctly recognized in the word intervals determined on the basis of the second likelihoods.

TABLE 1

Percentage at which a correct word interval is not extracted in the first order likelihood = 3.2%
Percentage at which a correct word interval is not extracted in the second order likelihood = 0.5%

Table 1 indicates that the erroneous boundary decision can be reduced down to 0.5% by adopting candidate intervals up to the second order likelihood. When word intervals of the same data are detected by the conventional method of deciding a word boundary, the error was 2.7%. In general, the word end is often silent and therefore subjected to the influence of background noise. Therefore, it is possible to obtain an accurate recognition result by determining plural end candidates.

By the system according to the present invention, it is possible to relieve recognition errors due to unrelievable word boundary errors caused by background noise.

Further, since the likelihood (i.e. the order) is adopted, the similarities of the second order candidates or less are required to be calculated, so that it is possible to reduce the calculations and thus realize a high-speed high-performance word recognition system.

Further, the present invention is not limited to the above embodiment. Although the embodiment has been explained of word speech recognition, it is of course possible to apply the present invention to speech recognition of a phoneme, a syllable, a clause, a sentence, etc.

In addition, the present invention can be modified in various way so as to be applied to a sound analysis system, a boundary detection method, etc. without departing the scope of the present invention.

What is claimed is:
1. A speech recognition system comprising:
 (a) means for analyzing a speech signal to obtain feature parameters of the speech signal;
 (b) means for determining start and end points when sound power of the speech signal analyzed by said analyzing means drops below a predetermined threshold, a maximum power and a maximum power point, calculating a means noise level, calculating at least one threshold on the basis of the mean noise level, and searching the sound power from the maximum power point in both rearward and forward directions to obtain word boundary candidates when the sound power drops below the calculated threshold level for a predetermined frame time interval to obtain likelihoods of the obtained start and end word boundary candidates on the basis of frame interval length;
 (c) means for equally dividing the obtained speech intervals of the obtained word boundary candidates into some sampling points to sample the feature parameters and calculating similiarities between the sampled feature parameters and reference pattern set, at each of the sampling points of the speech interval in the order of the likelihoods from the highest liklihood down to a predetermined lower likelihood; and
 (d) means for discriminating the speech signal as recognized outputs on the basis of the calculated similiarities obtained at a plurality of determined candidate speech intervals and arranged in the order of the likelihood.

2. The speech recognition system as set forth in claim 1, wherein said searching means comprises:
 (a) a first-stage word boundary searcher for determining a start point $F_O$ obtained when sound power $\{P_j\}$ analyzed by said analyzing means as one of feature parameters drops below a predetermined threshold $P_{TO}$ into the reverse direction of the time scale for a first predetermined frame time interval $F_S$, an end point $B_O$ obtained when the sound power drops below the threshold $P_{TO}$ in the forward direction of the time scale for a second predetermined frame time interval $F_S$, a maximum power $P_{max}$ and a maximum power point $F_x$;
 (b) a noise level calculator for calculating a mean front noise level $N_F$ near before the start point $F_O$ and mean back noise level $N_B$ near after the end point $N_F$;
 (c) a second-stage word boundary searcher for calculating thresholds $P_{TX}$ on the basis of the mean front noise level $N_F$ and the mean back noise level $N_B$, searching the sound power $\{P_j\}$ from the maximum power point $F_x$ in the backward direction to obtain start word boundary candidates $F_1$, $F_2$—when the sound power drops below the threshold level $P_{TX}$ for a predetermined frame time interval $F_C$ and to determine the likelihoods of the obtained start word boundary candidates on the basis of the frame time interval length, and searching the sound power $\{P_j\}$ from the maximum power point $F_X$ in the forward direction to obtain end word boundary candidates $B_1$, $B_2$—when the sound power drops below the threshold level $P_{TX}$ for a predetermined frame time interval $F_C$ and to determine likelihoods of the obtained end word boundary candidates on the basis of the frame time interval length; and (d) a likelihood calculator for determining likelihoods of speech intervals between the obtained start and end word boundary candidates on the basis of additions of the determined start and end word boundary likelihoods.

3. The speech recognition system as set forth in claim 2, wherein the threshold $P_{TO}$ is 2 to 5 times higher than background noise level.

4. The speech recognition system as set forth in claim 2, wherein the means front noise level $N_F$ is calculated by averaging noise levels between $(F_0-9)$ and $(F_0-1)$ frames and the mean back noise level $N_B$ is calculated by averaging noise levels between $(B_0+1)$ and $(B_0+9)$ frames.

5. The speech recognition system as set forth in claim 2, wherein the threshold $P_{TX}$ is determined as $P_{TX}+N_F\times(2$ to $3)$.

6. The speech recognition system as set forth in claim 2, wherein a second threshold $P_{TV}$ is determined as $P_{TV}=N_F\times(4$ to $6)$, and the likelihood is determined as 1 when sound power $\{P_j\}$ exceeds the threshold $P_{TV}$ for 6 to 8 frames, as ¼ when $\{P_j\}$ exceeds $P_{TV}$ for 2 to 5 frames, as 0 when $\{P_j\}$ exceeds $P_{TV}$ for 1 to 0 frames, and as ½ when a boundary candidate is first searched.

7. The speech recognition system as set forth in claim 2, wherein a third threshold $P_V$ is determined as $P_{max}/D$, where D is a constant, and a first word boundary candidate F' is cancelled when sound power $\{P_j\}$ exceeds the threshold $P_V$ afterward for a predetermined frames.

8. A method of searching a sound power of a speech recognized by a speech recognition system to determine speech boundary candidates and likelihoods of speech intervals, which comprises the following steps of:

(a) determining a start point $F_0$, an end point $B_0$, a maximum power $P_{max}$, and a maximum power point $F_X$;

(b) determining a mean front noise level $N_F$ near before the start point $F_0$ and a mean back noise level $N_B$ near after the end point $N_F$;

(c) determining a threshold $P_{TX}$ on the basis of the mean front noise level $N_F$ and the mean back noise level $N_B$;

(d) searching the sound power $\{P_j\}$ from the maximum power point $F_X$ in the backward direction to determine start word boundary candidates $F_1$, $F_2$—when the sound power drops below the threshold level $P_{TX}$ for a predetermined frame time interval $F_C$ and to determine likelihoods of the obtained start word boundary candidates on the basis of the frame time interval length;

(e) searching the sound power $\{P_j\}$ from the maximum power point $F_X$ in the forward direction to determine end word boundary candidates $B_1$, $B_2$—when the sound power drops below the threshold level $P_{TX}$ for a predetermined frame time interval $F_E$ and to determine likelihoods of the obtained end word boundary candidates on the basis of the frame time interval length; and (f) determining likelihoods of speech interval candidates on the basis of additions of the determined start and end word boundary likelihoods.

9. The method of searching a sound power as set forth in claim 8, wherein the step of determining the start point $F_0$ and the end point $B_0$ comprises the following steps of:

(a) determining background noise level $N_0$;
(b) determining a threshold $P_{TO}$ as $P_{TO}=3\times N_0$;
(c) determining the start point $F_0$ when the sound power $P(J)$ exceeds the threshold $P_{TO}$ for a predetermined frame time interval $F_C$ and the end point $B_0$ when the sound power $P(J)$ drops below the threshold $P_{TO}$ for a predetermined frame time interval $F_C$ after the sound power $(PCJ)$ has reached the maximum power $P_{max}$.

10. The method of searching a sound power as set forth in claim 8, wherein the step of determining the mean front and back noise levels $N_F$ and $N_B$ comprises the following steps of:

(a) adding the sound power $P(JX)$ from $(F_0-9)$ to $(F_0-1)$ frames;
(b) dividing the sound power addition by 9 to obtain the mean front noise level $N_F$;
(c) adding the sound power $P(JY)$ from $(B_0+1)$ to $(B_0+9)$ frames; and
(d) dividing the sound power addition by 9 to obtain the mean back noise level $N_B$.

11. The method of searching a sound power as set forth in claim 8, wherein the threshold $P_{TX}$ is determined as $P_{TX}=3\times N_F$.

12. The method of searching a sound power as set forth in claim 8, wherein the step of searching the sound power to determine the likelihoods of the start word boundary candidates comprises:

(a) determining the likelihood as 1 when the sound power first drops below the threshold $P_{TX}$;
(b) determining the likelihood as 0 when the sound power drops below the threshold $P_{TX}$ for 1 or less frame intervals;
(c) determining the likelihood as ¼ when the sound power drops below the threshold $P_{TX}$ for 2 to 5 frame intervals; and
(d) determining the likelihood as 1 when the sound power drops below the threshold $P_{TX}$ for 6 or more frame intervals.

13. The method of searching a sound power as set forth in claim 8, which further comprises the following steps of:

(a) determining a second threshold $P_{TV}$ as $P_{TV}=2\times P_{TX}$; and
(b) clearing a counter DCNTR for determining a search end when the sound power lies in level between the first and second thresholds $P_{TX}$ and $P_{TV}$.

14. The method of searching a sound power as set forth in claim 8, which further comprises the following steps of:

(a) determining a third threshold $P_V$ as $P_V=P_{max}/D$ where D is constant;
(b) clearing a counter DCNTR for determining a search end, a counter ACNTR for determining a likelihood and a likelihood order when the sound power exceeds this third threshold $P_V$ for a predetermined frame interval.

* * * * *